United States Patent
Kinoshita (10) Patent No.: US 7,446,296 B2
(45) Date of Patent: Nov. 4, 2008

(54) STREAK DEVICE

(75) Inventor: Katsuyuki Kinoshita, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 7 days.

(21) Appl. No.: 10/587,871

(22) PCT Filed: Jan. 18, 2005

(86) PCT No.: PCT/JP2005/000531

§ 371 (c)(1),
(2), (4) Date: Apr. 25, 2007

(87) PCT Pub. No.: WO2005/073681

PCT Pub. Date: Aug. 11, 2005

(65) Prior Publication Data

US 2007/0272833 A1 Nov. 29, 2007

(30) Foreign Application Priority Data

Jan. 30, 2004 (JP) ............................. 2004-024569

(51) Int. Cl.
*H01J 31/50* (2006.01)
(52) U.S. Cl. ................. 250/214 VT; 313/409
(58) Field of Classification Search ........... 250/214 VT; 313/409
See application file for complete search history.

(56) References Cited

U.S. PATENT DOCUMENTS

| | | | | |
|---|---|---|---|---|
| 4,661,694 A | * | 4/1987 | Corcoran | ............... 250/214 VT |
| 4,778,593 A | * | 10/1988 | Yamashita et al. | ........... 209/3.1 |
| 5,018,149 A | * | 5/1991 | Yanagisawa | .................... 372/2 |
| 5,278,403 A | * | 1/1994 | Alfano et al. | ......... 250/214 VT |
| 5,925,877 A | * | 7/1999 | Suzuki et al. | ......... 250/214 VT |
| 2001/0050334 A1 | * | 12/2001 | Jiang et al. | ............. 250/214 VT |

FOREIGN PATENT DOCUMENTS

| | | |
|---|---|---|
| JP | 4-73257 | 11/1992 |
| JP | 4-79465 | 12/1992 |
| JP | 5-73587 | 10/1993 |
| JP | 10-48044 | 2/1998 |
| WO | 96/33508 | 10/1996 |

\* cited by examiner

*Primary Examiner*—Georgia Y. Epps
*Assistant Examiner*—Kevin Wyatt
(74) *Attorney, Agent, or Firm*—Drinker Biddle & Reath LLP (57) ABSTRACT

A streak apparatus includes: a vacuum container 10 having an electron beam source 20 provided on one end side to emit an electron beam E and an output section 60 provided on the other end side to convert the electron beam into an image; an accelerating section 30 provided in the vacuum container to accelerate the electron beam; an irradiation optical system 40 for collecting and applying to-be-measured light R to the electron beam accelerated by the accelerating section; and a sweep section 50 provided between the accelerating section and the output section to sweep the electron beam having interacted with the to-be-measured light in a direction approximately perpendicular to the direction of a displacement of the electron beam generated through the interaction. This allows the streak apparatus to have a higher temporal resolution.

10 Claims, 11 Drawing Sheets

STREAK DEVICE

TECHNICAL FIELD

The present invention relates to a streak apparatus.

BACKGROUND ART

Streak apparatuses are for converting the temporal intensity distribution of to-be-measured light into a spatial intensity distribution on an output screen (refer to Patent Documents 1 and 2, for example). In such streak apparatuses, to-be-measured light first enters a photoelectric surface provided at one end of a streak tube. Then, acceleration electrodes accelerate a group of photoelectrons emitted from the photoelectric surface in accordance with the intensity of the to-be-measured light to cause them to travel toward a fluorescent screen provided at the other end of the streak tube.

In the streak tube, there are provided deflection electrodes composed of a pair of electrodes facing each other across the tube axis between the photoelectric surface and the fluorescent screen. Then, a deflection voltage is applied to the group of photoelectrons emitted from the photoelectric surface when passing between the deflection electrodes. This causes the group of photoelectrons to be deflected at different angles in the direction approximately perpendicular to the tube axis to enter the fluorescent screen and then to form a so-called streak image. Thus, the change in brightness in the sweep direction of the streak image shows the temporal change in the intensity of the to-be-measured light that enters the photoelectric surface.

Patent Document 1: Japanese Patent Publication No. H04-79465

Patent Document 2: Japanese Patent Publication No. H04-73257

DISCLOSURE OF THE INVENTION

Problems to be Solved by the Invention

Although in order to measure higher-speed phenomena, there have recently been increasing demands for higher temporal resolution of to-be-measured light, it is becoming difficult to respond to demand using such streak apparatuses as mentioned above.

Hence, an object of the present invention is to provide a streak apparatus capable of achieving a higher temporal resolution.

Means for Solving the Problems

The present inventor has devoted oneself to making an intense study of further improving the temporal resolution of streak apparatuses. Then, it is found that conventional streak apparatuses convert the temporal change information of the intensity of to-be-measured light into the temporal change in the number of photoelectrons in a photoelectric surface, which mainly limits the temporal resolution thereof.

Accordingly, in order to solve the above-described problems, a streak apparatus according to the present invention includes: a vacuum container having an electron beam source provided on one end side to emit an electron beam and an output section provided on the other end side to convert the electron beam emitted from the electron beam source into an image; an accelerating section provided in the vacuum container to accelerate the electron beam emitted from the electron beam source; an irradiation optical system for collecting and applying to-be-measured light to the electron beam accelerated by the accelerating section; and a sweep section provided between the accelerating section and the output section in the vacuum container to sweep the electron beam having interacted with the to-be-measured light in a direction approximately perpendicular to the direction of a displacement of the electron beam generated through the interaction.

In the arrangement above, the electron beam emitted from the electron beam source is accelerated by the accelerating section and travels in the vacuum container. The electron beam is irradiated with the to-be-measured light collected by the irradiation optical system to result in an interaction between the to-be-measured light and the electron beam. In this case, the strong electromagnetic field of the collected to-be-measured light causes the electron beam to be displaced depending on the intensity of the to-be-measured light.

The sweep section sweeps the electron beam having interacted with the to-be-measured light in a direction approximately perpendicular to the direction of the displacement. Then, the electron beam enters the output section provided on the other end side of the vacuum container to be converted into an image. In the image converted in the output section, the sweep direction of the electron beam by the sweep section corresponds to the time axis, while the axis approximately perpendicular to the time axis corresponds to the displacement of the electron beam, that is, the intensity of the electromagnetic field of the to-be-measured light. That is, the streak apparatus can provide a so-called streak image that shows the temporal change in the intensity of the to-be-measured light.

As mentioned above, the thus arranged streak apparatus makes it possible to pick up the temporal change in the intensity of the to-be-measured light. Also, in this streak apparatus, the to-be-measured light and the electron beam interact with each other so that the intensity information of the to-be-measured light is recorded into the electron beam. It is therefore possible to achieve a higher temporal resolution than in the conventional case where the temporal change information of the intensity of to-be-measured light is converted into the number of photoelectrons via a photoelectric surface.

Effects of the Invention

In a streak apparatus according to the present invention, to-be-measured light and an electron beam interact with each other so that the intensity information of the to-be-measured light is recorded into the electron beam. Therefore, the present invention can provide a streak apparatus capable of achieving a higher temporal resolution.

DESCRIPTION OF THE SYMBOLS 1, 1a, 1b—Streak apparatus, 10—Vacuum container, 20—Electron beam source, 20A—Photoelectric surface, 30—Accelerating section, 31—RF cavity, 40—Irradiation optical system, 50—Sweep section, 53—RF cavity, 60—Output section, 70A—First electron lens (electron lens system), 70B—Second electron lens (electron lens system), 70C—Third electron lens (electron lens system).

BEST MODES FOR CARRYING OUT THE INVENTION

A streak apparatus according to the present invention will hereinafter be described in detail with reference to the accompanying drawings. Additionally, in the descriptions of the drawings, identical components are designated by the same reference numerals to omit overlapping description.

Figure 1:
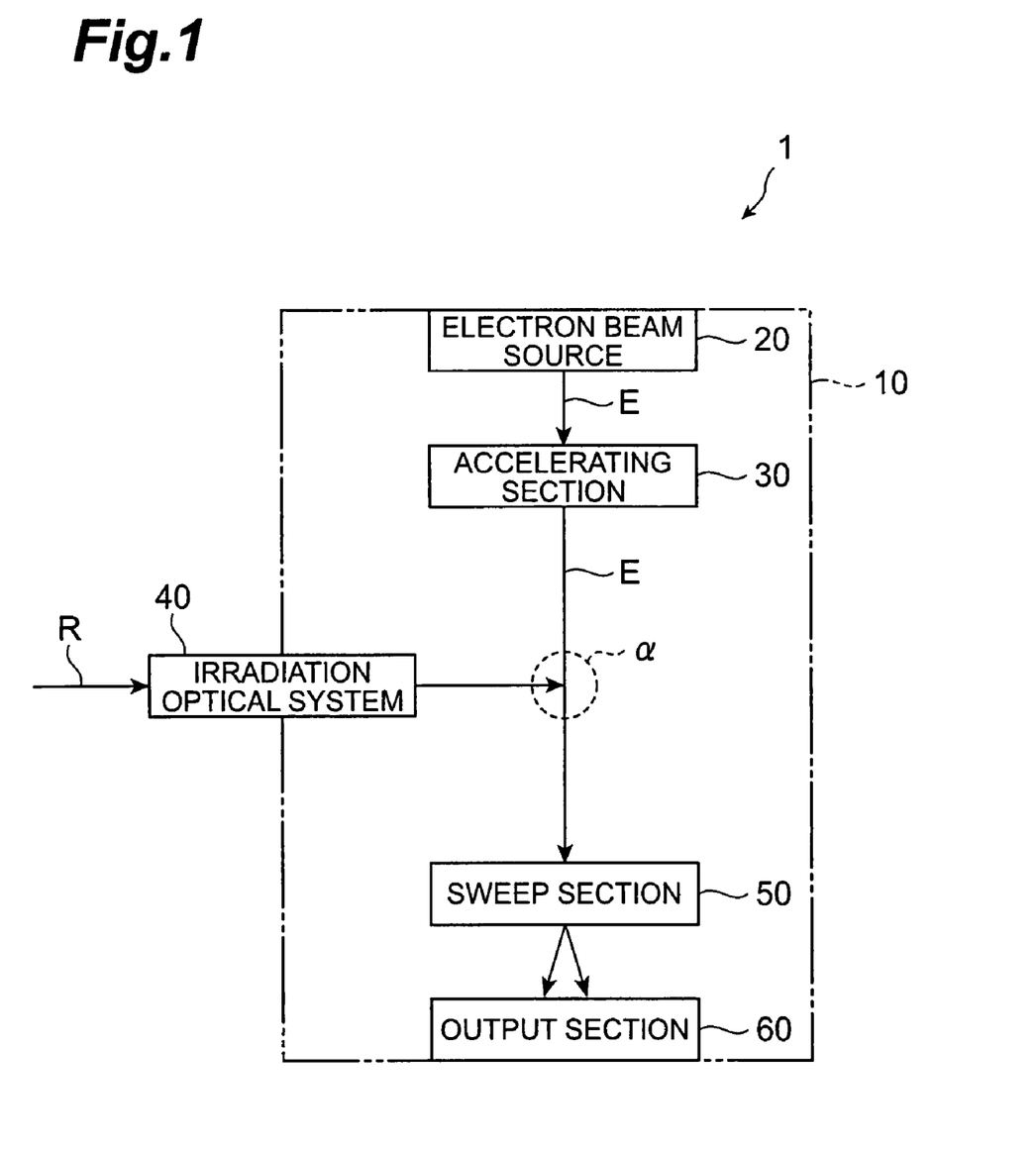
FIG. 1 is a block diagram illustrating the principle of a streak apparatus according to the present invention.

FIG. 1 is a block diagram illustrating the principle of a streak apparatus according to the present invention. As shown in FIG. 1, the streak apparatus 1 has: an electron beam source 20 provided on one end side of a vacuum container 10 to emit an electron beam E; an accelerating section 30 for accelerating the electron beam E; an irradiation optical system 40 for collecting and applying to-be-measured light R to the electron beam E accelerated by the accelerating section 30; a sweep section 50 for sweeping the electron beam E irradiated with the to-be-measured light R; and an output section 60 provided on the other end side of the vacuum container 10 to convert and output the electron beam E into an image.

In the thus arranged streak apparatus 1, the electron beam E emitted from the electron beam source 20 is accelerated by the accelerating section 30 to a high speed (e.g. about 10 MeV). The thus accelerated electron beam E is irradiated with the to-be-measured light R collected by the irradiation optical system 40. This causes the electron beam E and the to-be-measured light R to interact with each other so that the electromagnetic field of the to-be-measured light R causes the electron beam E to be displaced. The region on the trajectory of the electron beam E where interacting with the to-be-measured light R will hereinafter be referred to as an interaction region α.

The sweep section 50 sweeps and outputs the electron beam E having interacted with the to-be-measured light R in a direction approximately perpendicular to the direction of the displacement of the electron beam E. The electron beam E output from the sweep section 50 enters the output section 60 to be converted into an image.

Figure 2:
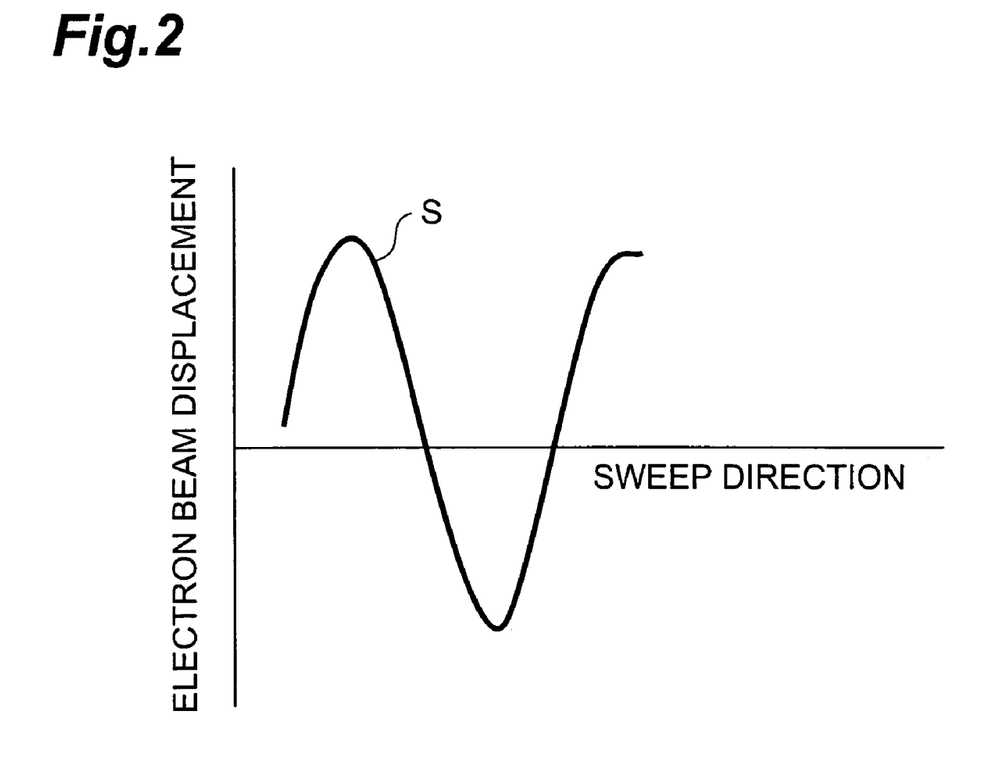
FIG. 2 is a schematic diagram of an image obtained by the streak apparatus 1.

FIG. 2 is a schematic diagram of an image obtained by the streak apparatus 1. The horizontal axis represents the sweep direction of the sweep section 50, corresponding to the time axis. The vertical axis represents the magnitude of the displacement of the electron beam E generated through the interaction with the to-be-measured light R. The magnitude of the displacement of the electron beam E depends on the intensity of the to-be-measured light R. Therefore, the vertical axis corresponds to the intensity of the to-be-measured light R. That is, the streak apparatus 1 can provide a so-called streak image S that shows the temporal intensity distribution of the to-be-measured light R.

Figure 3:
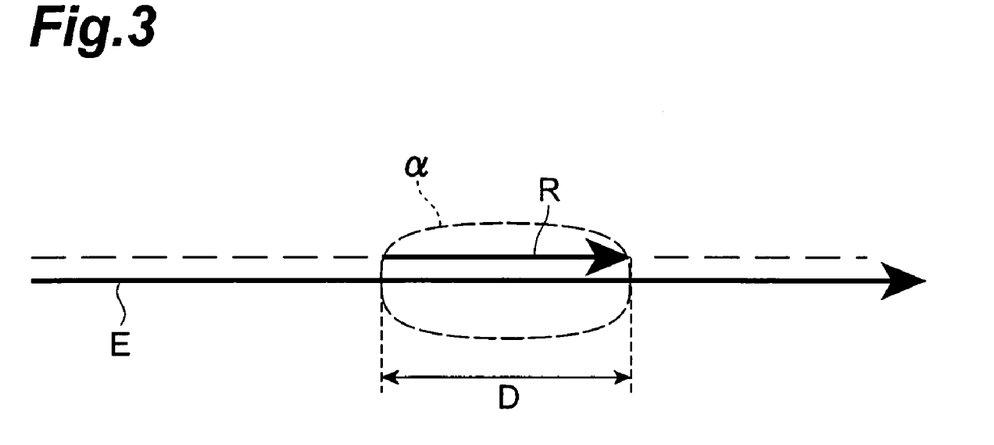
FIG. 3 is a view showing an example of a method for interaction between to-be-measured light R and an electron beam E.
Figure 4:
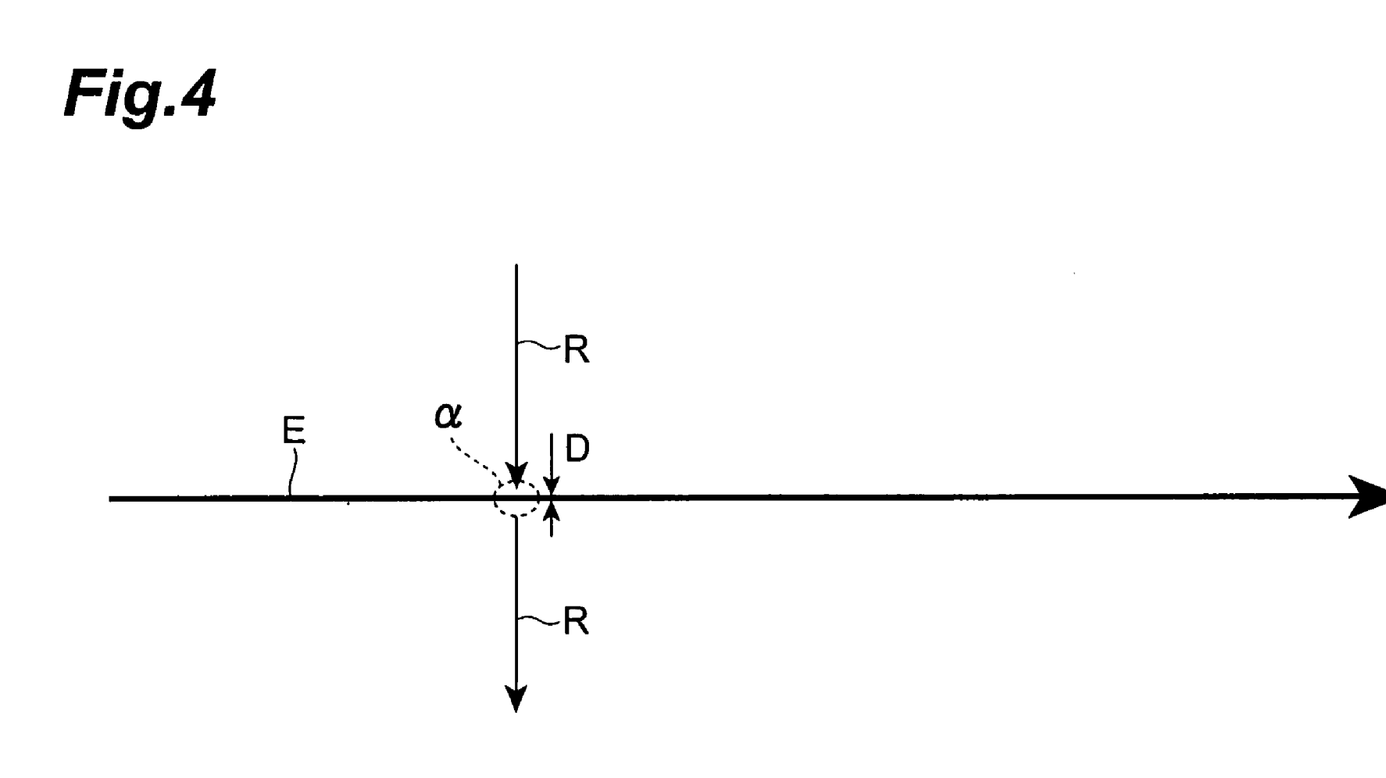
FIG. 4 is a view showing another example of a method for interaction between to-be-measured light R and an electron beam E.

FIG. 3 and FIG. 4 show examples of methods for interaction between to-be-measured light R and an electron beam E. The to-be-measured light R and the electron beam E may interact with each other by making the to-be-measured light R incident approximately parallel with the propagation direction of the electron beam E as shown in FIG. 3, or by making the to-be-measured light R incident approximately perpendicular to the propagation direction of the electron beam E as shown in FIG. 4. Since the case shown in FIG. 3 can achieve a relatively longer length D where the electron beam E and the to-be-measured light R overlap each other, the electron beam E is likely to have a greater displacement.

Next will be described specific embodiments of streak apparatuses to which the above-described principle is applied.

First Embodiment

Figure 5:
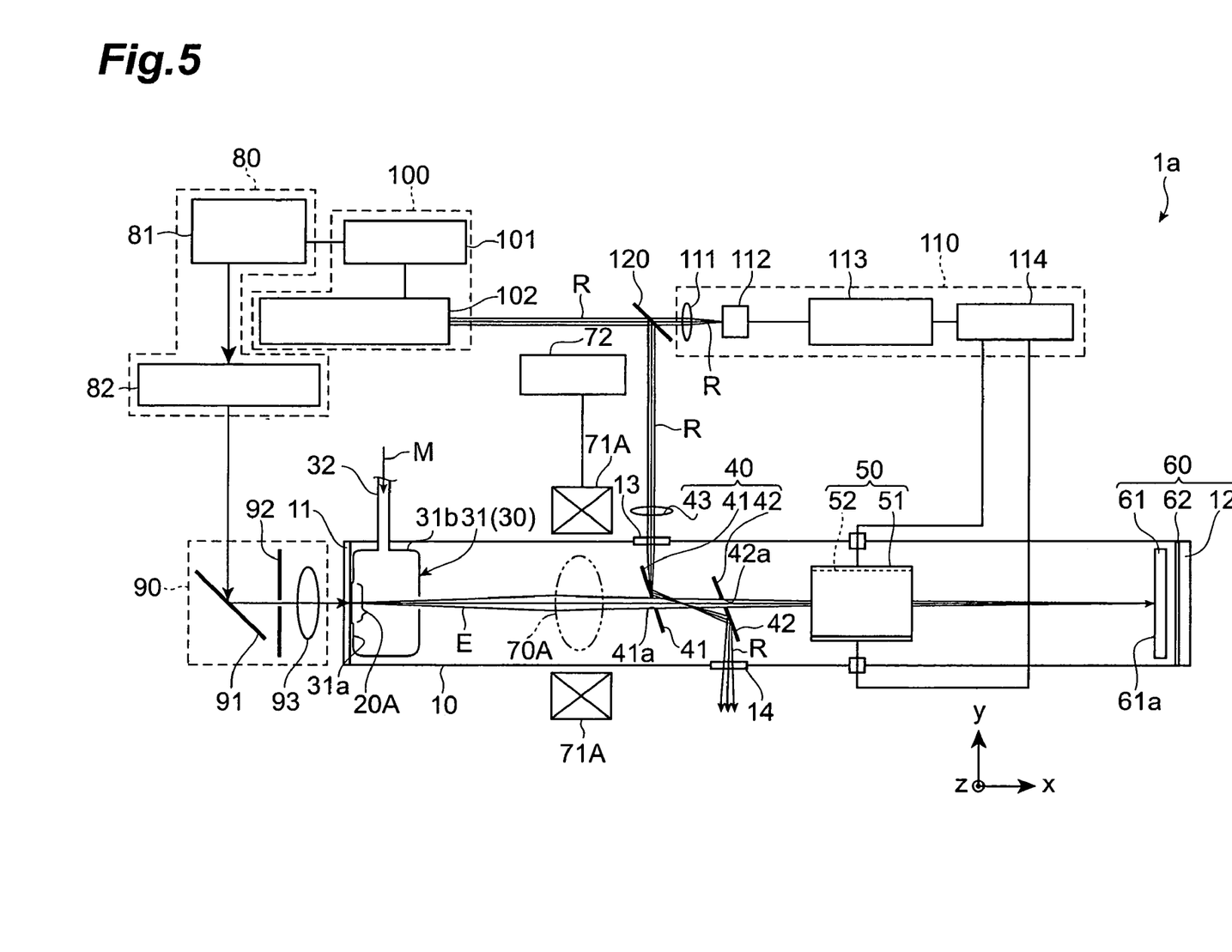
FIG. 5 is a schematic view showing the configuration of a streak apparatus 1a according to a first embodiment.

FIG. 5 is a schematic view showing the configuration of a streak apparatus 1a as a first embodiment of the foregoing streak apparatus 1. In the following descriptions, the electron beam source 20 is a photoelectric surface 20A for converting and outputting received light into photoelectrons, unless otherwise specified. Also, for the sake of convenience in making descriptions, the tube axis direction will be referred to as the X direction, the direction perpendicular to the paper surface as the Z direction, and the direction perpendicular to the X and Z directions as the Y direction.

The streak apparatus 1a includes a vacuum container 10 for traveling of an electron beam E, an accelerating section 30, an irradiation optical system 40, and a sweep section 50.

The vacuum container 10 has a cylindrical shape and is provided with an optically transparent window 11 at one end thereof. Then, the photoelectric surface 20A is formed on the surface of the optically transparent window 11 inside the vacuum container 10. The photoelectric surface 20A is formed at the position where the center axis (tube axis) of the vacuum container 10 intersects with the optically transparent window 11. The photoelectric surface 20A is, for example, a gold thin film deposited on the optically transparent window 11 at a thickness of several tens of nanometers.

The photoelectric surface 20A receives a laser beam made incident through the optically transparent window 11 and emits photoelectrons (electron beam E) into the vacuum container 10 from the surface opposite the surface where the laser beam enters.

There is also provided an output section 60 on the end side of the vacuum container 10 opposite the optically transparent window 11 in the X direction. The output section 60 includes a micro-channel plate (MCP) 61, a fluorescent screen 62, and an output window 12 provided at the other end of the vacuum container 10. The MCP 61 is adapted to multiply the electron beam E input through the MCP input surface 61a and to output the beam toward the fluorescent screen 62. The fluorescent screen 62 is adapted to convert the electron beam E from the MCP 61 into a visible-light image. The visible-light image converted in the fluorescent screen 62 is to be observed through the output window 12 using an optical relay lens and a TV camera arranged outside the window.

The accelerating section 30 includes an RF cavity 31 and is arranged next to the optically transparent window 11. The one sidewall 31a of the RF cavity 31 on the side of the optically transparent window 11 includes the photoelectric surface 20A. Also, the sidewall 31b of the RF cavity 31 is connected with an introduction pipe 32 for introducing a microwave M into the RF cavity 31. The photoelectrons emitted from the photoelectric surface 20A are to be accelerated to about 10 MeV (i.e. near the speed of light) through the electromagnetic field of the microwave M introduced into the RF cavity 31 and then output through an opening. Additionally, in the present embodiment, the electron beam E propagates along the tube axis. More concretely, the cross-sectional center of the electron beam in a plane approximately perpendicular to the tube axis corresponds approximately with the intersection of the plane with the tube axis.

The sweep section 50 is arranged between the accelerating section 30 and the output section 60 in the vacuum container 10. The sweep section 50 includes a pair of deflection electrodes 51 and 52 arranged in a facing manner across the tube axis. In the streak apparatus 1a, the deflection electrodes 51 and 52 are arranged in parallel in the Z direction. In the figure, the deflection electrodes 51 and 52 are drawn in a slightly displaced manner to indicate that the deflection electrode 52 is provided in a deeper position.

Between the accelerating section 30 and the sweep section 50 and on the tube axis, there is formed a first electron lens (electron lens system) 70A. The first electron lens 70A is formed by a first focusing coil 71A provided around the vacuum container 10. The first focusing coil 71A is provided with the tube axis as a center axis, and is connected to a coil power supply 72. The first focusing coil 71A is arranged, for example, about several hundreds of millimeters apart from the RF cavity 31 toward the output section 60.

Further, in the peripheral wall of the vacuum container 10 between the first electron lens 70A (or first focusing coil 71A) and the sweep section 50, there are provided an incident window 13 for introducing to-be-measured light R into the vacuum container 10 and an exit window 14 for bringing the to-be-measured light R out of the vacuum container 10. The incident window 13 is provided, for example, about 50 mm apart from the first focusing coil 71A toward the output section 60.

The irradiation optical system 40 includes a pair of reflecting mirrors 41 and 42 and a lens 43. The reflecting mirrors 41 and 42 are adapted to cause the to-be-measured light R introduced into the vacuum container 10 through the incident window 13 to interact with the electron beam E. The reflecting mirrors 41 and 42 are planar mirrors, being arranged in parallel in the X direction between the accelerating section 30 and the sweep section 50 and on the tube axis. The spacing between the reflecting mirrors 41 and 42 is, for example, about several millimeters. There are formed openings 41a and 42a for passing the electron beam E therethrough in the respective reflecting mirrors 41 and 42.

The reflecting mirror 41 is inclined with respect to the tube axis and is arranged in such a manner as to reflect the to-be-measured light R made incident through the incident window 13 toward the reflecting mirror 42. Also, the reflecting mirror 42 is inclined with respect to the tube axis and is arranged in such a manner as to reflect the to-be-measured light R from the reflecting mirror 41 toward the exit window 14.

The lens 43 is a refractive imaging lens. The lens 43 is adapted to collect the to-be-measured light R between the reflecting mirrors 41 and 42 and on the trajectory of the electron beam E (i.e. on the tube axis) at a diameter of, for example, about several tens of micrometers. The lens 43 is arranged outside the vacuum container 10, and the to-be-measured light R passes through the lens 43 and then enters the vacuum container 10 through the incident window 13.

The streak apparatus 1a further has: a light source section 80 for generating a laser beam to be made incident to the photoelectric surface 20A; an input optical system 90 for incidence of the laser beam from the light source section 80 to the photoelectric surface 20A; a to-be-measured light generating section 100 for generating to-be-measured light R; and a sweep control section 110 for controlling the sweep section 50.

The light source section 80 includes a laser generating device 81 and a higher-harmonic wave generating device 82. The laser generating device 81 is, for example, a Ti-sapphire laser for generating a laser beam with a wavelength of 800 nm and a pulse width of about 100 fs. Additionally, the laser generating device 81 is adapted to output an output signal to the to-be-measured light generating section 100 in accordance with the output timing of the laser beam.

The higher-harmonic wave generating device 82 is adapted to convert the laser beam output from the laser generating device 81 into light with a wavelength that causes the photoelectric surface 20A to emit photoelectrons, for example, into a laser beam with a wavelength of about 270 nm if the photoelectric surface 20A is a gold thin film.

The input optical system 90 has a reflecting mirror 91, an aperture 92, and a lens 93. The laser beam from the higher-harmonic wave generating device 82 is to be reflected at the reflecting mirror 91 to enter the photoelectric surface 20A, which is deposited on the optically transparent window 11, through the aperture 92 and the lens 93.

The aperture 92 and the lens 93 are for limiting the increase in the diameter of the laser beam on the photoelectric surface 20A. The aperture 92 and the lens 93 are adapted to collect the laser beam on the photoelectric surface 20A at a diameter of, for example, about 10 μm. This allows both the diameter of the electron beam E in the interaction region α where the electron beam E generated from the photoelectric surface 20A and the to-be-measured light R interact with each other and that of the electron beam E on the MCP 61 to be several tens of micrometers or less.

The to-be-measured light generating section 100 includes a delay circuit 101 and a to-be-measured light generating device 102. The delay circuit 101 is connected electrically to the laser generating device 81 and the to-be-measured light generating device 102. The delay circuit 101 is adapted to input the output signal from the laser generating device 81 to the to-be-measured light generating device 102 in such a manner as to match the timing between the to-be-measured light R and the electron beam E, that is, at an adjusted timing so that the to-be-measured light R and the electron beam E interact with each other. Additionally, such delay means may employ an optical delaying device instead of an electrical delaying device.

The to-be-measured light generating device 102 is, for example, a laser light source, being adapted to output to-be-measured light R using the signal input from the delay circuit 101 as a trigger. The to-be-measured light R output from the to-be-measured light generating device 102 is divided into two light beams at a half mirror 120, one of which enters the vacuum container 10 through the lens 43 and the incident window 13.

The other to-be-measured light R divided at the half mirror 120 enters the sweep control section 110. The sweep control section 110 includes a lens 111, a detector 112, a delay circuit 113, and a sweep circuit 114.

The lens 111 is adapted to collect the to-be-measured light R after passing through the half mirror 120 to be made incident to the detector 112. The detector 112 is, for example, a PIN diode, being adapted to detect the to-be-measured light and then to input a detection signal to the delay circuit 113. The delay circuit 113 is adapted to input the detection signal input from the detector 112 to the sweep circuit 114 at an adjusted timing so that a deflection voltage is applied to the sweep section 50 when the electron beam E enters the sweep section 50.

The sweep circuit 114 is connected electrically to the deflection electrodes 51 and 52, being adapted to apply a deflection voltage between the deflection electrodes 51 and 52 using the signal from the delay circuit 113 as a trigger.

Figure 6:
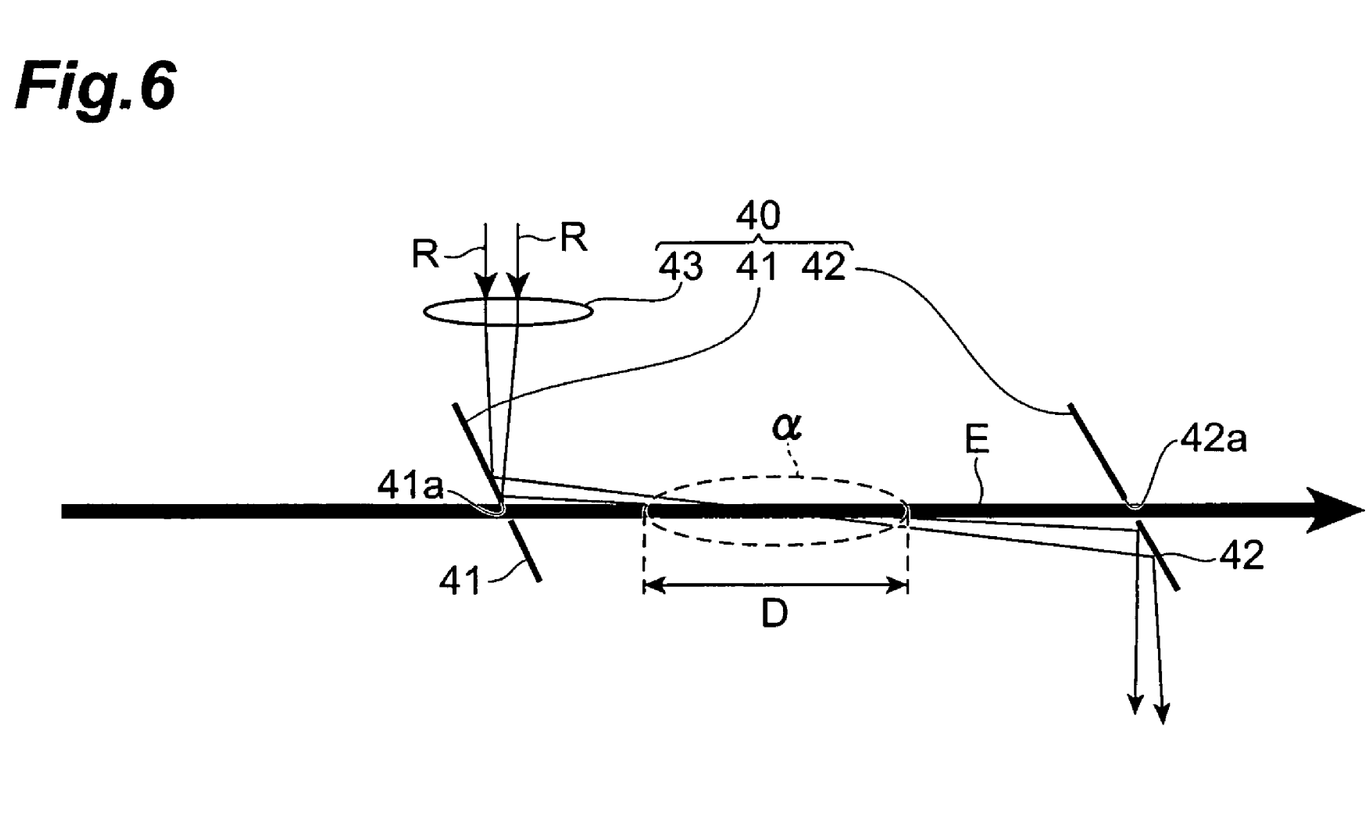
FIG. 6 is a schematic diagram of an irradiation optical system 40.

The thus arranged irradiation optical system 40 will be described in more detail. FIG. 6 is a schematic diagram of the irradiation optical system 40.

As mentioned above, the irradiation optical system 40 includes the reflecting mirrors 41 and 42 and the lens 43. The reflecting mirror 41 is adapted to reflect the to-be-measured light R after passing through the lens 43 toward the reflecting mirror 42. Here, the reflecting mirror 41 is arranged in such a manner that the to-be-measured light R is reflected at a region nearer the lens 43 with respect to (above in the figure) the opening 41a, and that the reflected light propagates toward a region on the reflecting mirror 42 below the opening 42a in the figure.

The arrangement above causes the to-be-measured light R to intersect with the electron beam E while propagating approximately parallel with the traveling direction of the electron beam E. Therefore, the width D of the interaction region a where the to-be-measured light R and the electron beam E overlap each other is increased relatively.

In addition, the lens 43 is arranged in such a manner, as mentioned above, that the diameter of the to-be-measured light R is minimized (i.e. the to-be-measured light R is focused) in the region (interaction region $\alpha$) where the to-be-measured light R and the electron beam E intersect with each other. This causes the electromagnetic field of the to-be-measured light R to be strengthened relatively in the interaction region $\alpha$.

The operation of the thus arranged streak apparatus 1a will be described with reference to FIG. 5. In the following descriptions, the laser generating device 81 is a Ti-sapphire laser as mentioned above. Further, the higher-harmonic wave generating device 82 is adapted to convert a laser beam from the laser generating device 81 into light with a wavelength of 270 nm.

First, the laser generating device 81 generates a laser beam with a wavelength of 800 nm and a pulse width of about 100 fs. Here, an output signal is input to the delay circuit 101 in response to the output of the laser beam from the laser generating device 81.

The laser beam from the laser generating device 81 enters the higher-harmonic wave generating device 82 to be converted into a laser beam with a wavelength of 270 nm and then output from the higher-harmonic wave generating device 82. The laser beam output from the higher-harmonic wave generating device 82 is guided into the vacuum container 10 through the reflecting mirror 91. The laser beam from the reflecting mirror 91 passes through the aperture 92 and the lens 93 to be collected in such a manner as to have a diameter of about 10 μm on the photoelectric surface 20A and then reach the photoelectric surface 20A.

When the laser beam thus enters the photoelectric surface 20A, photoelectrons (electron beam E) are emitted from the photoelectric surface 20A into the RF cavity 31. Here, since the light with a pulse width of 100 fs enters the photoelectric surface 20A, the photoelectric surface 20A correspondingly generates a high-density pulse electron beam E with a pulse width of 100 fs.

The electron beam E is accelerated to about 10 MeV through the electromagnetic field of the microwave M introduced into the RF cavity 31 and then output toward the output section 60. The electron beam E output from the RF cavity 31 is to be focused on the MCP input surface 61a through the first electron lens 70A. The electron beam E after passing through the first electron lens 70A interacts with to-be-measured light R between the pair of reflecting mirrors 41 and 42 before reaching the MCP 61, and then is swept by the sweep section 50 in a direction approximately perpendicular to the paper surface.

Here will be described (1) a method for interaction between the to-be-measured light R and the electron beam E and (2) a method for sweeping the electron beam E after the interaction.

First will be described (1) a method for interaction between the to-be-measured light R and the electron beam E.

An output signal is input from the laser generating device 81 to the delay circuit 101 in response to the output of the laser beam from the laser generating device 81. The output signal is input to the to-be-measured light generating device 102 after being adjusted for a certain period of time in the delay circuit 101. The to-be-measured light generating device 102 outputs to-be-measured light R using the signal from the delay circuit 101 as a trigger. The to-be-measured light R output from the to-be-measured light generating device 102 is divided into two components: one for incidence to the vacuum container 10 through the half mirror 120; and the other for incidence to the sweep control section 110.

The to-be-measured light R reflected at the half mirror 120 and bent toward the vacuum container 10 is introduced into the vacuum container 10 through the lens 43 and the incident window 13. Then, as shown in FIG. 5 and FIG. 6, the to-be-measured light R is reflected at a region on the reflecting mirror 41 above the opening 41a to propagate toward a region on the reflecting mirror 42 below the opening 42a.

The to-be-measured light R is generated at an adjusted timing so that the to-be-measured light R and the electron beam E can interact with each other. Therefore, the to-be-measured light R thus reflected at the reflecting mirror 41 and the electron beam E overlap and interact with each other between the reflecting mirrors 41 and 42. The to-be-measured light R reaching the reflecting mirror 42 after the interaction with the electron beam E is further reflected at the reflecting mirror 42 to be drawn out of the vacuum container 10 through the exit window 14.

As mentioned above, the electron beam E and the to-be-measured light R interact with each other between the reflecting mirrors 41 and 42. That is, the interaction region $\alpha$ where the electron beam E and the to-be-measured light R interact with each other is positioned between the reflecting mirrors 41 and 42. The to-be-measured light R is collected by the lens 43 to have a diameter of, for example, about several tens of micrometers in this interaction region $\alpha$. Thus, the electromagnetic field of the to-be-measured light R is strengthened in the interaction region $\alpha$, the strong electromagnetic field causing the electron beam E to be displaced.

Although the direction of the displacement depends on the oscillation direction of the electromagnetic field of the to-be-measured light R, it is assumed in the present embodiment that the electron beam E is displaced in the Y direction due to the interaction with the to-be-measured light R.

Next will be described (2) a method for sweeping the electron beam E having interacted with the to-be-measured light R.

After being output from the to-be-measured light generating device 102 and divided at the half mirror 120, the to-bemeasured light R transmitting through the half mirror 120 is detected in the detector 112. A detection signal from the detector 112 is input to the delay circuit 113. Then, the signal is input from the delay circuit 113 to the sweep circuit 114 at an adjusted timing so that the sweep section 50 can sweep the electron beam E. The sweep circuit 114 applies a deflection voltage between the deflection electrodes 51 and 52 using the signal from the delay circuit 113 as a trigger. An electric field formed due to the deflection voltage sweeps the electron beam E.

As mentioned above, the deflection voltage is applied between the deflection electrodes 51 and 52 at the timing where the high-density pulse electron beam E emitted from the photoelectric surface 20A passes through the sweep section 50. Thus, the electron beam E having interacted with the to-be-measured light R is swept by the electric field due to the deflection voltage. Since the deflection electrodes 51 and 52 are arranged in parallel in the Z direction, the electron beam E is to be swept by the sweep section 50 in a direction approximately perpendicular to the direction of the displacement (+Z direction or −Z direction).

The electron beam E swept by the sweep section 50 is input to the MCP input surface 61a. Here, since the electron beam E is collected by the first electron lens 70A, the electron beam E has a diameter of about several tens of micrometers on the MCP input surface 61a. The electron beam E input to the MCP 61 is multiplied by the MCP 61 to be output on the fluorescent screen 62 and then converted into a visible-light image through the fluorescent screen 62. Then, the image is taken by the TV camera via the relay lens, which are provided outside the output window 12, to provide a streak image S as shown in FIG. 2.

In the streak apparatus 1a according to the present embodiment, the to-be-measured light R and the electron beam E interact directly with each other to measure the temporal change in the displacement of the electron beam E generated by the electromagnetic field of the to-be-measured light R, that is, the temporal change in the intensity of the to-be-measured light R. Unlike the conventional case where the intensity information of to-be-measured light is converted into the density of photoelectrons via a photoelectric surface, it is possible to achieve a higher temporal resolution with an eye to, for example, attosecond range temporal resolution.

Meanwhile, since the electromagnetic field of light has a large frequency, even if an electron beam and light may interact with each other, there can commonly be a case where a displacement of the electron beam is cancelled by the opposite phase.

However, in the streak apparatus 1a according to the present embodiment, since the electron beam E is accelerated by the accelerating section 30 to near the speed of light, the phase of the to-be-measured light R and the electron beam E is likely to be coherent. For example, if the to-be-measured light R has a wavelength of 800 nm, it is possible to ensure a traveling distance of about 300 μm until the mutual phase difference between the light and the electron beam reaches the half wavelength. It is therefore possible to detect the displacement of the electron beam E. Then, such a traveling distance is to be ensured by the irradiation optical system 40.

Further, since the to-be-measured light R is collected to be applied to the electron beam E, the electromagnetic field of the to-be-measured light R is further strengthened in the interaction region α where the to-be-measured light R and the electron beam E interact with each other. It is therefore possible to cause the electron beam E to be further displaced relative to the case of being not collected, which facilitates the measurement of the displacement.

In addition, since the to-be-measured light R is made incident diagonally to the traveling direction of the electron beam E, the component of the to-be-measured light R in the traveling direction of the electron beam E is likely to have a speed lower than that of light. It is therefore easy to keep the electron beam E in the same phase state as the electromagnetic field of the to-be-measured light R even if the electron beam E has a speed lower than that of light.

Additionally, achieving an attosecond to femtosecond range temporal resolution requires conditions such as reducing the Rayleigh length of the laser irradiation optical system, increasing the speed of the electron beam to a certain level, or more. In accordance with simulations, achieving a temporal resolution of about 10 fs requires an electron beam speed of 1 MeV or more if the Rayleigh length is 2 μm, while an electron beam speed of 10 to 20 MeV if the Rayleigh length is 130 μm.

Also, the electron beam is to be accelerated not only in the direction of the displacement to be used for measurement but also in the traveling direction of the electron beam. This changes the arrangement of the electron beam also in the traveling direction of the electron beam, which may cause an error in the time axis direction. In order to reduce such an error, the electron beam preferably has a speed of 1 MeV or more.

Second Embodiment

Figure 7:
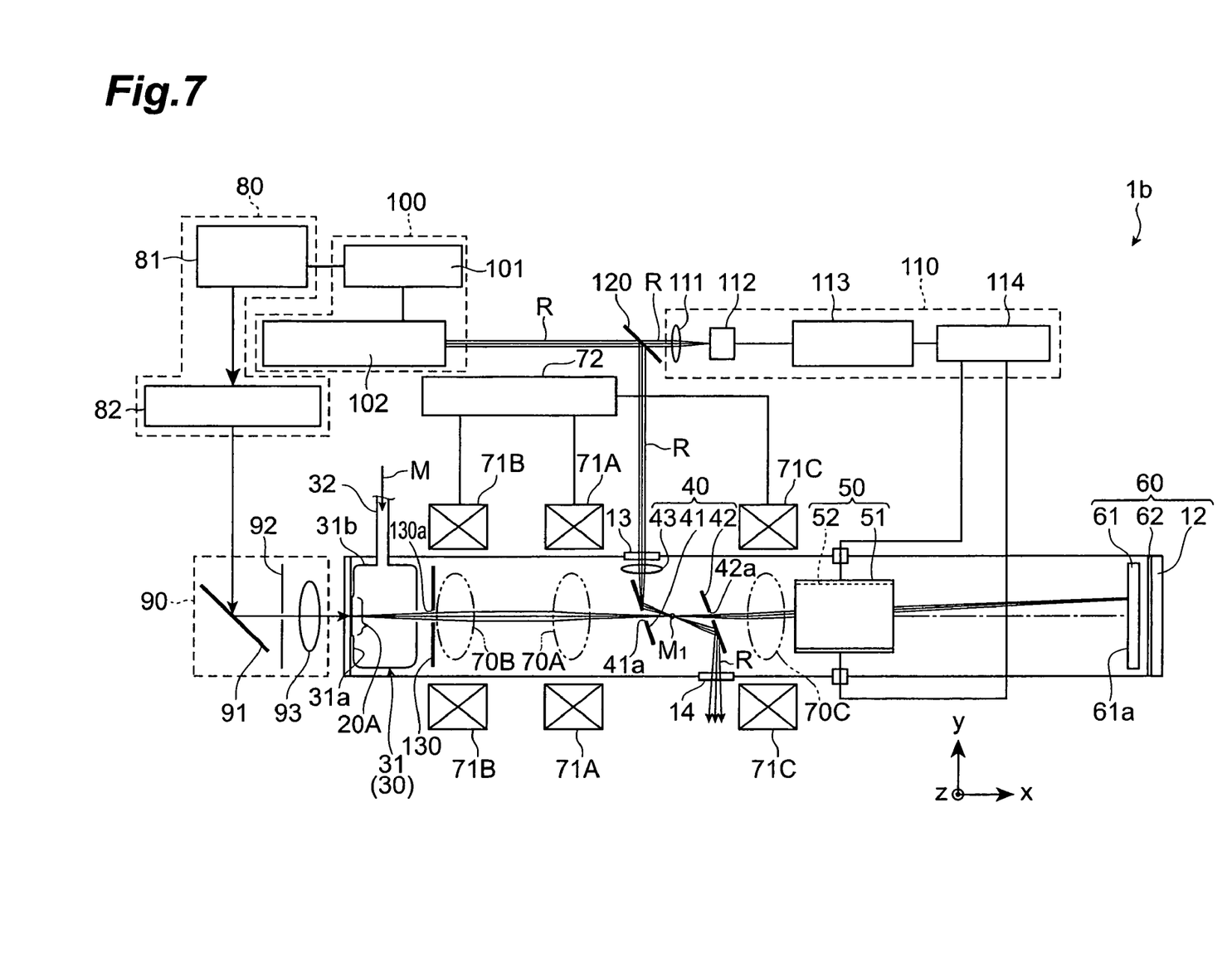
FIG. 7 is a schematic view showing the configuration of a streak apparatus 1b according to a second embodiment.

FIG. 7 is a schematic view showing the configuration of a streak apparatus according to a second embodiment. The streak apparatus 1b shown in FIG. 7 is different from the streak apparatus 1a according to the first embodiment in that the lens 43 is arranged inside the vacuum container 10, an aperture diaphragm electrode 130 is provided, and second and third electron lenses 70B and 70C are formed. In the streak apparatus 1b, the first, second, and third electron lenses 70A, 70B, and 70C constitute an electron lens system 70 for focusing an electron beam E emitted from the photoelectric surface 20A on the MCP 61.

The lens 43 is arranged inside the vacuum container 10 and has a shorter focal distance than that in the first embodiment. Thus, the diameter of the to-be-measured light R in the interaction region α is about one-digit smaller than that in the first embodiment (e.g. several micrometers). Therefore, in the case of using to-be-measured light R having the same intensity as that in the first embodiment, the electromagnetic field of the to-be-measured light R is strengthened relatively in the interaction region α.

The aperture diaphragm electrode 130 is arranged on the output side of the RF cavity 31 and on the tube axis. The aperture diaphragm electrode 130 has an opening 130a for passing the electron beam E therethrough, being adapted to reject the part of the electron beam E output from the RF cavity 31 outside the opening 130a. The opening 130a has a diameter of, for example, about several tens of micrometers. This improves the focusing characteristics of the electron beam E onto the MCP input surface 61a.

The second electron lens 70B is formed between the aperture diaphragm electrode 130 and the first electron lens 70A. The second electron lens 70B is formed by a second focusing coil 71B provided between the accelerating section 30 and the first focusing coil 71A and around the vacuum container 10. The second focusing coil 71B is arranged with the tube axis as a center axis and is connected to the coil power supply 72.

The second electron lens 70B is adapted to function as a collimator electron lens for limiting the spread of the electron beam E. The second electron lens 70B is also adapted to focus the electron beam E between the reflecting mirrors 41 and 42 together with the first electron lens 70A. Thus, the diameter of the electron beam E in the interaction region α is smaller than that in the streak apparatus 1a, being about several micrometers, for example. It is further arranged that the focusing point $M_1$ of the electron beam E coincides approximately with the collection point of the to-be-measured light R collected by the lens 43.

The third electron lens 70C is adapted to magnify the displacement of the electron beam E to form an image on the MCP input surface 61a. That is, the third electron lens 70C is adapted to function as a magnifying electron lens. The third electron lens 70C is formed between the interaction region α and the sweep section 50, and more concretely between the reflecting mirror 42 and the sweep section 50. The third electron lens 70C is formed by a third focusing coil 71C provided between the incident window 13 and the sweep section 50 and around the vacuum container 10. The third focusing coil 71C is arranged with the tube axis as a center axis and is connected to the coil power supply 72.

Additionally, such a magnifying electron lens may be provided in the stage following the sweep section 50. In general, a magnifying electron lens included in an electron lens system is arranged in the stage following an interaction region where to-be-measured light and an electron beam interact with each other, and is only required to magnify a displacement of the electron beam generated through the interaction with the to-be-measured light to form an image on an output section. This allows the displacement of the electron beam to be magnified and detected, which facilitates the detection even if the displacement may be small.

Figure 8:
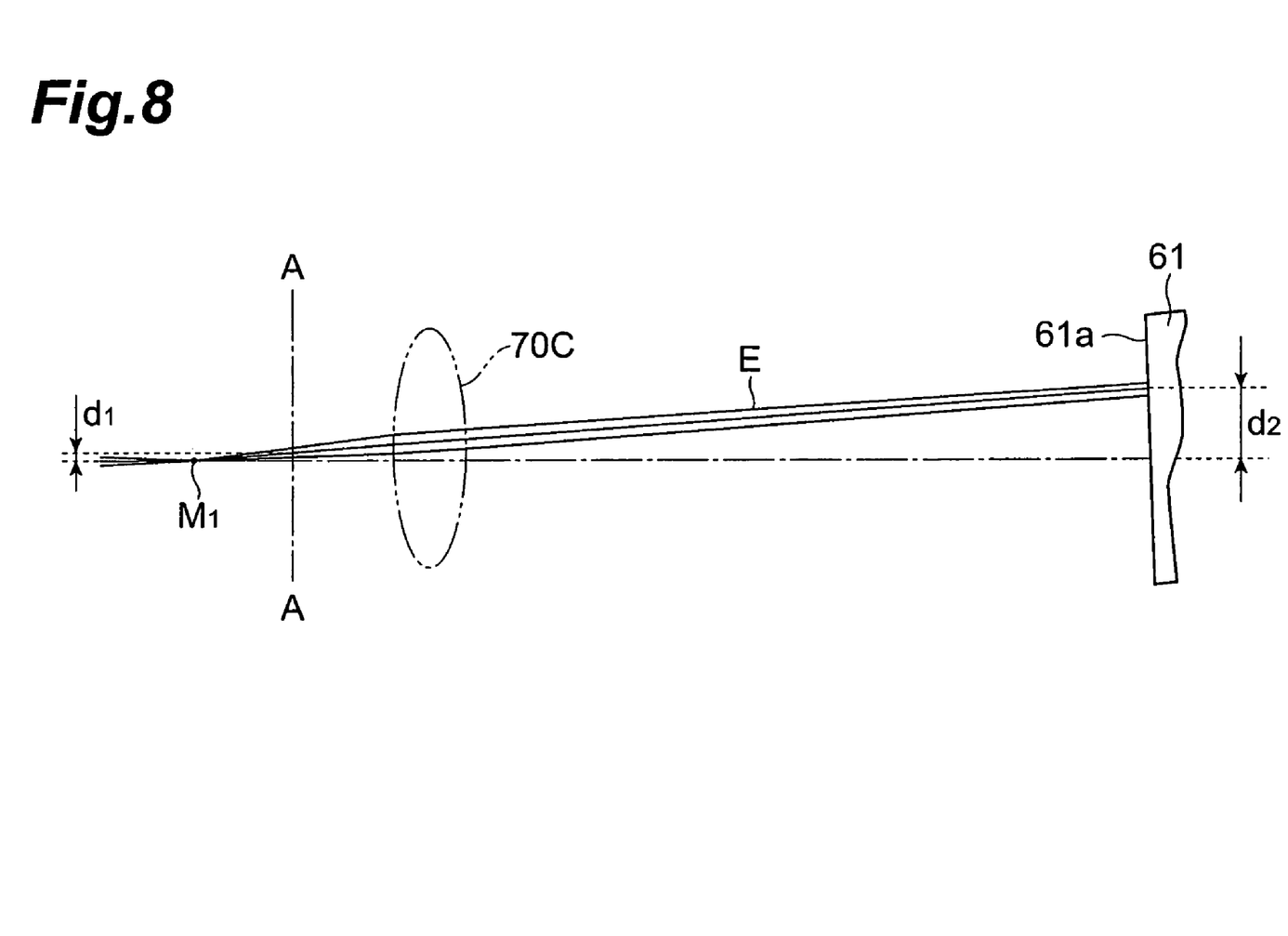
FIG. 8 is a view illustrating a method for magnifying the displacement of an electron beam E.

FIG. 8 is a view illustrating a method for magnifying the displacement of an electron beam E. The third electron lens 70C is arranged and formed in such a manner as to magnify the cross-section of the electron beam at the A-A line position, which is nearer the MCP 61 than the focusing point $M_1$ (e.g. about 15 mm apart from the focusing point $M_1$ toward the MCP 61), to form an image on the MCP input surface 61a. This is for the reason that if the focusing point $M_1$ is imaged on the MCP input surface 61a, no displacement of the electron beam E is to be imaged, although the focusing point $M_1$ itself is magnified and imaged on the MCP input surface 61a.

As mentioned above, magnifying the cross-section of the electron beam along the A-A line allows a displacement $d_1$ at the A-A line position to be magnified to a displacement $d_2$ on the MCP input surface 61a. The magnifying power of the third electron lens 70C depends on, for example, the shape of the magnetic poles of the third focusing coil 71C, the coil current, and the position of the third electron lens 70C, capable of achieving several tens to several hundreds of times.

Meanwhile, the diameter of the electron beam E itself is also increased at the A-A line position. Then, when the electron beam E passes through the third electron lens 70C, the diameter is also magnified and imaged on the MCP input surface 61a, which reduces the accuracy in detecting the amount of displacement on the fluorescent screen 62. However, in the streak apparatus 1b according to the present embodiment, the focal depth can be increased using the aperture diaphragm electrode 130 and the second electron lens 70B, which can limit the reduction of the detection accuracy.

The operation of the streak apparatus 1b according to the present embodiment is the same as that of the streak apparatus 1a according to the first embodiment.

In the present embodiment, since the lens 43 is arranged inside the vacuum container 10 and has a short focal distance, the diameter of the to-be-measured light R is reduced in the interaction region α as mentioned above. Thus, the electromagnetic field of the to-be-measured light R is strengthened relatively in the interaction region α. Therefore, the electron beam E is likely to be displaced. The diameter of the electron beam E is also reduced in the interaction region α correspondingly to the fact that the diameter of the to-be-measured light R is reduced. Therefore, the electron beam E is still likely to be displaced even if the diameter of the to-be-measured light R is reduced. Further, the displacement generated in the interaction region α is magnified by the third electron lens 70C to be input to the MCP 61.

For the foregoing reasons, the streak apparatus 1b can measure the temporal change in the intensity of to-be-measured light R even if the intensity may be small.

Figure 9:
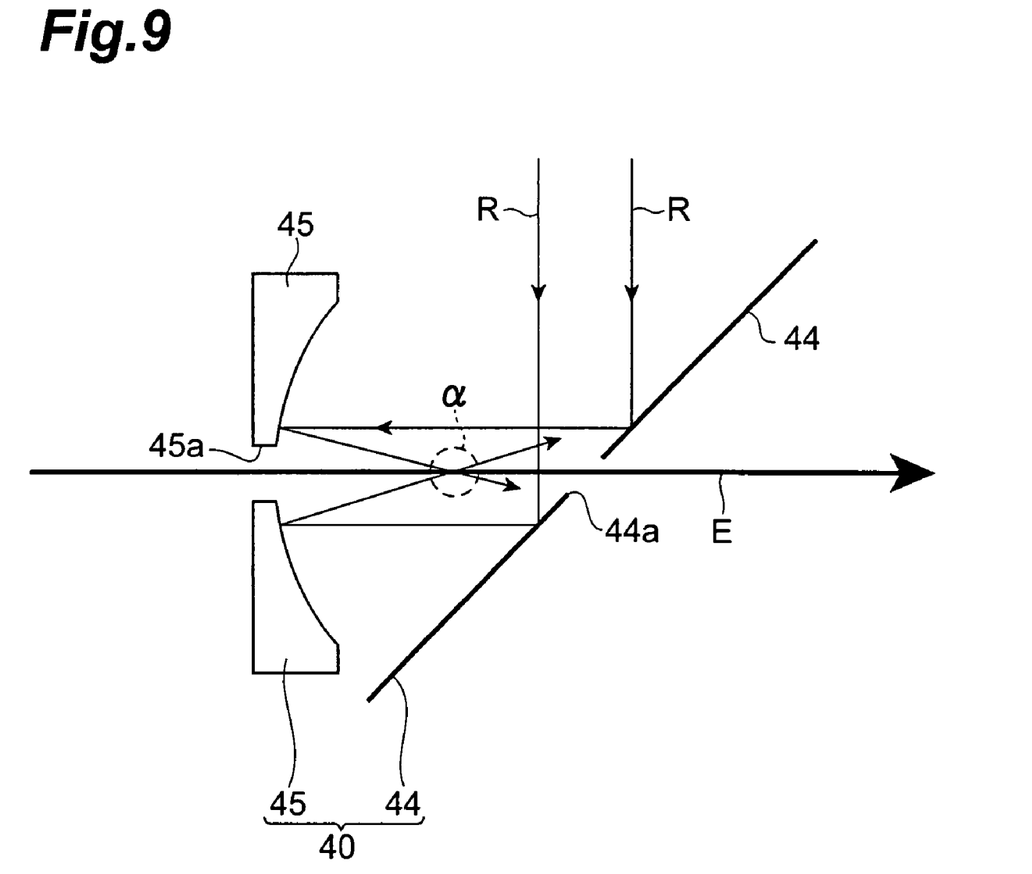
FIG. 9 is a schematic diagram of a modification of the irradiation optical system 40.

Although the preferred embodiments of the present invention have been described above, it is a matter of course that the present invention is not limited to the first and second embodiments. For example, the irradiation optical system 40, which is composed of the refractive imaging lens 43 and the pair of reflecting mirrors 41 and 42, may be composed of a planar reflecting mirror 44 and a reflective concave mirror 45 as shown in FIG. 9. The reflecting mirror 44 and the concave mirror 45 have, respectively, openings 44a and 45a for passing the electron beam E therethrough.

In the case above, the to-be-measured light R made incident through the incident window 13 (refer to FIG. 5 or FIG. 7) is reflected at the reflecting mirror 44 toward the concave mirror 45. Then, the light is reflected again at the concave mirror 45 toward the reflecting mirror 44. Here, the to-be-measured light R is collected on the tube axis to interact with the electron beam E. In this case, it is possible to simplify the configuration of the optical system as well as to obtain the temporal intensity distribution of the to-be-measured light R more precisely because no lens 43 is used to cause a temporal spread of the to-be-measured light R due to light dispersion when passing through the lens 43.

Also, the electron beam source 20 is not limited to the photoelectric surface 20A, but may employ a micro emitter made of Si or carbon. Further, the accelerating section 30 may be arranged in such a manner as to accelerate the electron beam E using the electromagnetic field of a laser beam. Alternatively, a laser plasma accelerating method may be used.

Furthermore, it is also preferable to provide an energy filter for passing an electron beam having a predetermined energy (e.g. 10 MeV) therethrough between the accelerating section 30 and the output section 60. In this case, passing the electron beam E emitted from the electron beam source 20 and accelerated by the accelerating section 30 through the energy filter makes it possible to utilize only a narrow energy range of the electron beam E. This allows the beam diameter when the electron beam E is imaged to be reduced between the reflecting mirrors 41 and 42, or the focal depth of the imaging to be increased, for example, in the second embodiment. It is also possible to limit the temporal spread of the electron beam E.

The electron lens system 70, which employs the rotationally symmetric magnetic electron lens system using the focusing coils, may employ an asymmetric electromagnetic or electrostatic electron lens system such as a quadrupole electron lens.

Figure 10:
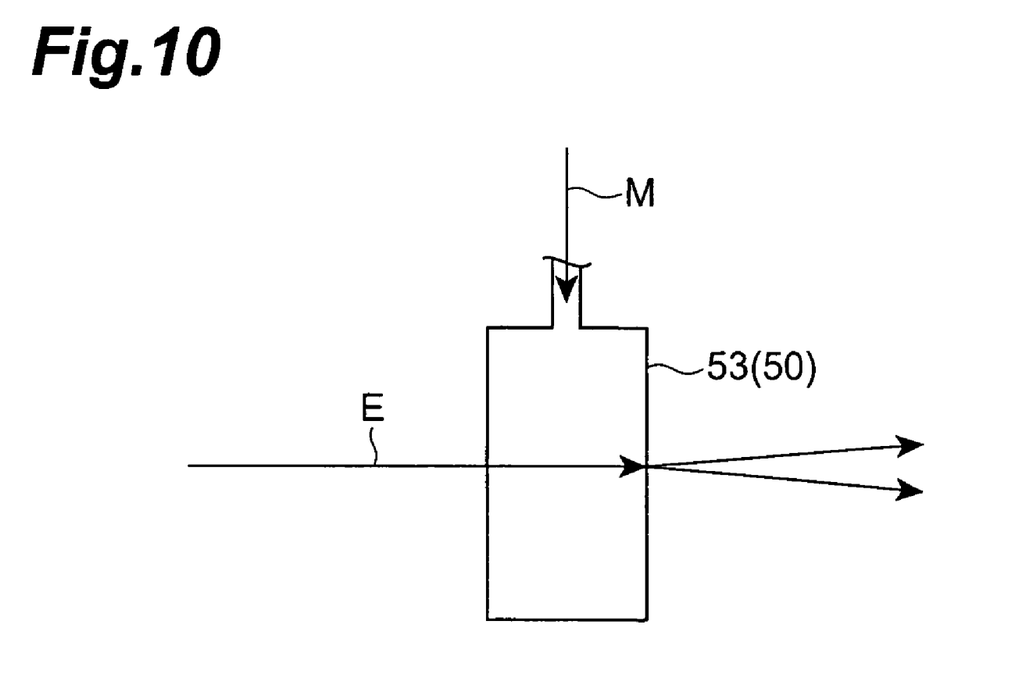
FIG. 10 is a schematic diagram of a modification of the sweep section 50.

In addition, the sweeping of the electron beam E by the sweep section 50 may not use the electric field due to the deflection voltage applied between the deflection electrodes 51 and 52. For example, an RF cavity 53 may be provided, as shown in FIG. 10, to introduce an RF or microwave M therein for sweeping using the electromagnetic field thereof. It is further possible to use the electromagnetic field of a laser beam for sweeping.

Figure 11:
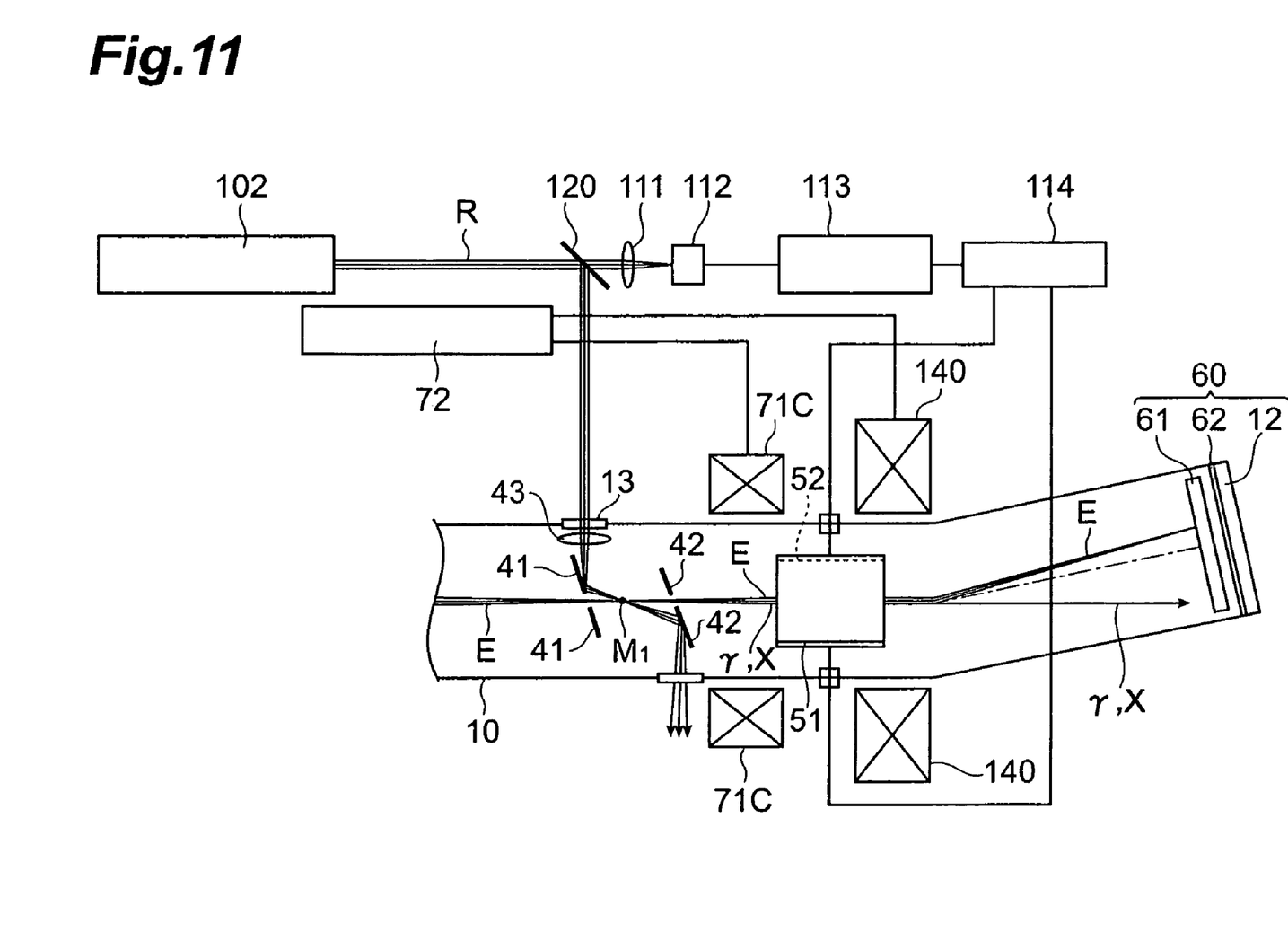
FIG. 11 is a schematic diagram of a modification of the streak apparatus 1b.

Also, as shown in FIG. 11, a deflection coil 140 may be provided between the sweep section 50 and the output section 60 and around the vacuum container 10. In this case, even if a γ-ray or X-ray may be generated in the interaction region α due to the interaction between the to-be-measured light R and the electron beam E, the electron beam and the γ-ray, X-ray can be separated by shifting the electron beam E using the deflection magnetic field of the deflection coil 140. It is therefore possible to reduce background noises due to the incidence of the γ-ray and X-ray to the MCP 61.

Further, the output section 60, which has the MCP 61, fluorescent screen 62, and output window 12, may employ an electron-bombarded CCD, being only required to convert the electron beam E into an image.

In addition, the to-be-measured light R is not limited to a laser beam. Further, when measuring to-be-measured light with the electromagnetic field being oscillated randomly, it is preferable to arrange a slit electrode nearer the photoelectric surface 20A than the sweep section 50 (i.e. between the reflecting mirror 42 and the sweep section 50) with the longitudinal direction thereof coinciding approximately with the direction perpendicular to the sweep direction. This is for the reason that it is possible to measure the displacement of the electron beam E having interacted with the to-be-measured light only in the longitudinal direction of the slit electrode.

In general, the streak apparatus according to the present invention preferably includes: a vacuum container having an electron beam source provided on one end side to emit an electron beam and an output section provided on the other end side to convert the electron beam emitted from the electron beam source into an image; an accelerating section provided in the vacuum container to accelerate the electron beam emitted from the electron beam source; an irradiation optical system for collecting and applying to-be-measured light to the electron beam accelerated by the accelerating section; and a sweep section provided between the accelerating section and the output section in the vacuum container to sweep the electron beam having interacted with the to-be-measured light in a direction approximately perpendicular to the direction of a displacement of the electron beam generated through the interaction.

In the thus arranged streak apparatus, it is also preferable to accelerate the electron beam using a laser beam or an electromagnetic field generated in an RF cavity. This makes it easy to accelerate the electron beam to near the speed of light. If the speed of the electron beam is near the speed of light, the phase of the electron beam and the to-be-measured light is likely to be coherent during the interaction therebetween. Therefore, the electron beam is likely to be displaced by the to-be-measured light.

It is preferable that the streak apparatus further include an electron lens system arranged in the stage following the accelerating section in the vacuum container to focus the electron beam from the accelerating section on the output section. In this case, since the electron lens system focuses the electron beam on the output section, the diameter of the electron beam on the output section is reduced so that the temporal resolution is likely to be improved. Also, the electron lens system is preferably arranged between the accelerating section and the sweep section.

Furthermore, in the streak apparatus, the electron lens system preferably has a magnifying electron lens arranged in the stage following the region for the interaction between the to-be-measured light and the electron beam to magnify the displacement of the electron beam generated through the interaction with the to-be-measured light to form an image on the output section. In this case, the magnifying electron lens allows the displacement of the electron beam to be magnified and detected, which facilitates the detection even if the displacement may be small. Also, in such an arrangement, the magnifying electron lens is preferably arranged between the region for the interaction between the to-be-measured light and the electron beam and the sweep section.

It is preferable that the streak apparatus further includes an energy filter arranged between the accelerating section and the output section in the vacuum container to pass an electron beam having a predetermined energy therethrough. In this case, the energy dispersion of the electron beam after passing through the energy filter can be reduced relative to before passing through the energy filter.

Also, in the streak apparatus, the electron beam source is preferably a photoelectric surface for converting received light into photoelectrons. In this case, photoelectrons are to be emitted and an electron beam is to be generated by applying a laser beam, etc., to the photoelectric surface. It is also possible to generate a pulse electron beam easily by applying a pulse laser beam.

Further, in the streak apparatus, the sweep section preferably sweeps the electron beam using an electric field due to a deflection voltage applied between a pair of deflection electrodes that face each other across the tube axis of the vacuum container, a laser beam, or an electromagnetic field generated in an RF cavity.

In the case of using a pair of deflection electrodes, the electron beam can be swept by applying a deflection voltage between the deflection electrodes and using an electric field generated between the electrodes. Also, in the case of using an RF cavity, the electron beam can be swept by introducing an RF or microwave into the RF cavity and using the electromagnetic field thereof. Further, in the case of using a laser sweeper, the electron beam can be swept using the electromagnetic field of a laser beam.

INDUSTRIAL APPLICABILITY

The streak apparatus according to the present invention is applicable to, for example, a measurement apparatus for clarifying attosecond range high-speed optical phenomena.

The invention claimed is:

1. A streak apparatus comprising:
  a vacuum container having an electron beam source provided on one end side to emit an electron beam and an output section provided on the other end side to convert the electron beam emitted from the electron beam source into an image;
  an accelerating section provided in the vacuum container to accelerate the electron beam emitted from the electron beam source;
  an irradiation optical system for collecting and applying to-be-measured light to the electron beam accelerated by the accelerating section; and
  a sweep section provided between the accelerating section and the output section in the vacuum container to sweep the electron beam having interacted with the to-be-measured light in a direction approximately perpendicular to the direction of a displacement of the electron beam generated through the interaction.

2. The streak apparatus according to claim 1, wherein the accelerating section is adapted to accelerate the electron beam using a laser beam or an electromagnetic field generated in an RF cavity.

3. The streak apparatus according to claim 1, further comprising an electron lens system arranged in the stage following the accelerating section in the vacuum container to focus the electron beam from the accelerating section on the output section.

4. The streak apparatus according to claim 3, wherein the electron lens system has a magnifying electron lens arranged in the stage following the region for the interaction between the to-be-measured light and the electron beam to magnify the displacement of the electron beam generated through the interaction with the to-be-measured light to form an image on the output section.

5. The streak apparatus according to claim 4, wherein the magnifying electron lens is arranged between the region for the interaction between the to-be-measured light and the electron beam and the sweep section.

6. The streak apparatus according to claim 1, further comprising an energy filter arranged between the accelerating section and the output section in the vacuum container to pass an electron beam having a predetermined energy therethrough.

7. The streak apparatus according to claim 1, wherein the electron beam source is a photoelectric surface for converting received light into photoelectrons.

8. The streak apparatus according to claim 1, wherein the sweep section is adapted to sweep the electron beam using an electric field due to a deflection voltage applied between a pair of deflection electrodes that face each other across the tube axis of the vacuum container, a laser beam, or an electromagnetic field generated in an RF cavity.

9. The streak apparatus according to claim 3, wherein the electron lens system includes a focusing electron lens system arranged between the accelerating section and the region for the interaction between the to-be-measured light and the electron beam to focus the electron beam from the accelerating section in the region for the interaction.

10. The streak apparatus according to claim 9, wherein, in the region for the interaction, the focusing point of the electron beam by the electron lens system coincides approximately with the collection point of the to-be-measured light by the irradiation optical system.

* * * * *